United States Patent
Natu et al.

(10) Patent No.: US 10,671,416 B2
(45) Date of Patent: *Jun. 2, 2020

(54) LAYERED VIRTUAL MACHINE INTEGRITY MONITORING

(71) Applicant: INTEL CORPORATION, Santa Clara, CA (US)

(72) Inventors: Mahesh S. Natu, Sunnyvale, CA (US); Shamanna M. Datta, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/665,382

(22) Filed: Jul. 31, 2017

(65) Prior Publication Data

US 2017/0371689 A1 Dec. 28, 2017

Related U.S. Application Data

(63) Continuation of application No. 13/797,924, filed on Mar. 12, 2013, now Pat. No. 9,720,716.

(51) Int. Cl.
*G06F 9/455* (2018.01)
*G06F 21/53* (2013.01)
*G06F 21/57* (2013.01)
*G06F 11/30* (2006.01)

(52) U.S. Cl.
CPC ...... *G06F 9/45533* (2013.01); *G06F 9/45558* (2013.01); *G06F 11/30* (2013.01); *G06F 11/3058* (2013.01); *G06F 21/53* (2013.01); *G06F 21/57* (2013.01); *G06F 11/301* (2013.01); *G06F 2009/45591* (2013.01)

(58) Field of Classification Search
CPC .......... G06F 21/52–54; G06F 11/3003; G06F 11/301; G06F 11/302; G06F 9/45533
See application file for complete search history.

(56) References Cited

U.S. PATENT DOCUMENTS

| | | | |
|---|---|---|---|
| 7,685,638 B1 * | 3/2010 | Buches | G06F 21/53 726/22 |
| 2003/0074315 A1 * | 4/2003 | Lam | G06Q 20/042 705/42 |
| 2003/0130953 A1 * | 7/2003 | Narasimhan | G06F 21/10 705/59 |
| 2003/0196136 A1 * | 10/2003 | Haynes | G06F 11/0715 714/13 |

(Continued)

*Primary Examiner* — Emerson C Puente
*Assistant Examiner* — Zhi Chen

(57) ABSTRACT

Various embodiments are generally directed to the provision and use of various hardware and software components of a computing device to monitor the state of layered virtual machine (VM) monitoring software components. An apparatus includes a first processor element; and logic to receive an indication that a first timer has reached an end of a first period of time, monitor execution of a VMM (virtual machine monitor) watcher by a second processor element, determine whether the second processor element completes execution of the VMM watcher to verify integrity of a VMM before a second timer reaches an end of a second period of time, and transmit an indication of the determination to a computing device. Other embodiments are described and claimed.

22 Claims, 9 Drawing Sheets

(56) References Cited

U.S. PATENT DOCUMENTS

| | | | |
|---|---|---|---|
| 2004/0123137 A1* | 6/2004 | Yodaiken | G06F 21/55 726/22 |
| 2005/0038827 A1* | 2/2005 | Hooks | G06F 11/0748 |
| 2006/0200726 A1* | 9/2006 | Gittins | G06F 11/0727 714/763 |
| 2006/0224887 A1* | 10/2006 | Vesikivi | G06F 21/35 713/166 |
| 2009/0327741 A1* | 12/2009 | Zimmer | G06F 21/575 713/183 |
| 2010/0241905 A1* | 9/2010 | Avritzer | G06F 11/1438 714/38.13 |
| 2011/0296192 A1* | 12/2011 | Hayashi | G06F 12/1441 713/180 |
| 2013/0028068 A1* | 1/2013 | Park | H04B 7/0478 370/203 |
| 2014/0019598 A1* | 1/2014 | Krajec | H04L 67/1002 709/220 |
| 2014/0035560 A1* | 2/2014 | Olmos | G01R 31/31719 324/76.41 |

\* cited by examiner

LAYERED VIRTUAL MACHINE INTEGRITY MONITORING

CROSS-REFERENCE TO RELATED APPLICATION

This application is a continuation of, claims the benefit of, and claims priority to U.S. patent application Ser. No. 13/797,924 filed on Mar. 12, 2013, the subject matter of which is incorporated herein by reference in its entirety.

TECHNICAL FIELD

Embodiments described herein generally relate to the use of multiple hardware and software components to provide layered monitoring of the integrity of virtual machines.

BACKGROUND

As the use of server-based computing services (e.g., so-called "cloud" computing) becomes more prevalent, the security of the servers employed to provide those services becomes increasingly important. Also, the types of services provided by such servers have increased in variety. As a result, efforts by those seeking unauthorized access to such services provided to others and to the servers that provide those services (e.g., so-called "hacking" or "cyber attacks") have increased in number and changed in character.

Early efforts at compromising the security of such servers focused largely on compromising specific applications software employed by servers to provide a specific type or range of services. By way of example, such early efforts focused on compromising the database maintenance application, the search engine application, the data archiving application, the monetary or financial transaction application, etc. executed by a processor of a server to provide a specific type of service. The goal was often to gain access to sensitive data by compromising the security of the application that handles it.

However, more recent efforts at compromising the security of servers have focused more on compromising operating system or other core software employed in providing the more basic functionality of the server itself. Among such core software to become a more recent prevalent target is the virtual machine monitor (VMM) that creates and maintains the separate virtual machines for different accounts atop which customers employing the services of such servers may cause the execution of any of a variety of different applications software or combinations of applications software.

In response to this changing security threat, various pieces of VMM software have been devised to constantly watch each virtual machine active on a server for indications of having been compromised and/or of other issues. However, the efforts to compromise the virtual machines have continued to become more sophisticated, and now include efforts to compromise the VMM software itself. It is with respect to these and other considerations that the embodiments described herein are needed.

DETAILED DESCRIPTION

Figure 1:
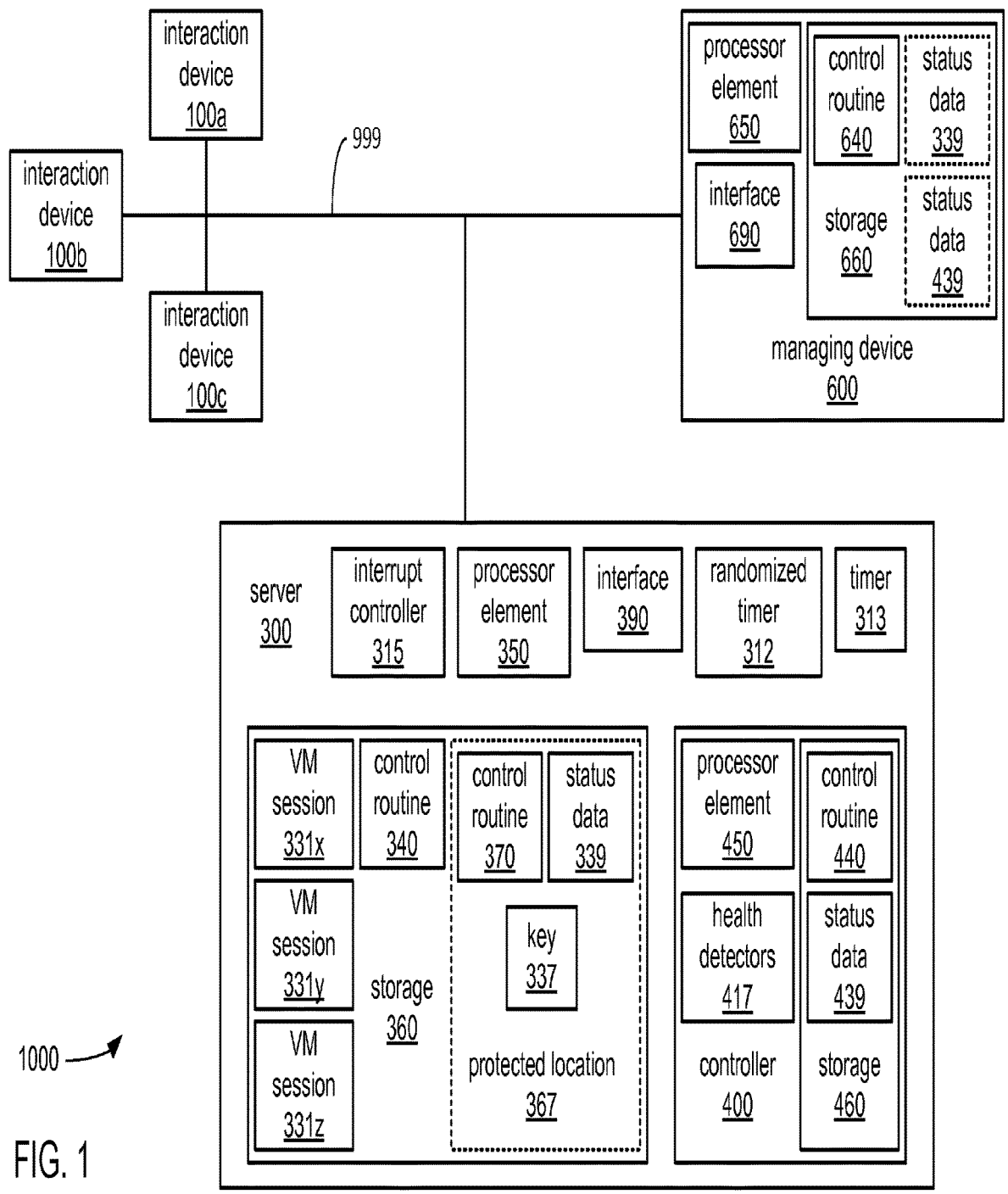
FIG. 1 illustrates a first embodiment of interaction among computing devices.

Various embodiments are generally directed to the provision and use of various hardware and software components of a computing device to monitor the state of layered virtual machine monitoring (VMM) software components. More specifically, a combination of hardware-based timers with restricted access, a controller that includes an independent processor element and storage, and a secondary communications channel to a managing device cooperate to monitor watcher software that monitors VMM software that in turn monitors multiple virtual machine sessions.

In a main operating environment of a server defined by at least a processor element and storage of the server, a VMM component monitors and controls the operation of multiple virtual machines, within each of which the processor element is caused to execute one or more pieces of applications software. The VMM component enforces restrictions against accesses from one virtual machine into another. The VMM may respond to attempts at such unauthorized accesses between virtual machines by disabling or removing the virtual machine from within which such unauthorized accesses are attempted.

Within a hardware protected area of the storage of the main operating environment, a VMM watcher performs periodic status checks of the VMM component to ensure that the VMM component is functioning correctly and that its integrity has not been compromised. The periodic status checks are triggered by a randomized hardware timer in which the interval of time may randomly change between each instance of triggering a status check. Indications of the results of such status checks of the VMM component are caused to be transmitted by the VMM watcher to a managing device that is separate and distinct from the server.

In a controller environment that is separate and distinct from the main operating environment, a watcher verifier stored in a controller storage and executed by a controller processor element checks the VMM watcher to ensure that the VMM watcher is functioning correctly and that its integrity has not been compromised. These checks of the VMM watcher entail the watcher verifier monitoring the progress of the status checks of the VMM conducted by the VMM watcher. Indications of the results of such checks of VMM watcher are transmitted by the watcher verifier to the managing device separately from the transmissions caused to occur by the VMM watcher.

The managing device receives these separate indications of the status of the VMM and of the VMM watcher, and employs these indications to determine the current overall status of the server. The managing device may respond to one or more specific determinations of the status of the server by transmitting a command to the controller processor element to restart the server and/or to take other server management action, such as provide an alert indication to an operator. It should be noted that despite the centering of discussion largely within a single server, it is envisioned that the techniques disclosed herein would be applied to multiple servers, and that the managing device would receive such status information from multiple servers.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 depicts a block diagram of interactions among computing devices of a computing services system 1000 comprising one or more of interaction devices 100*a-c* of operators seeking to make use of server-based computing services, a server 300 to provide such services, and a managing device 600 to oversee operation of the server 300. Each of these computing devices 100*a-c*, 300 and 600 may be any of a variety of types of computing device, including without limitation, a desktop computer system, a data entry terminal, a laptop computer, a netbook computer, an ultrabook computer, a tablet computer, a handheld personal data assistant, a smartphone, a digital camera, a mobile device, a body-worn computing device incorporated into clothing, a computing device integrated into a vehicle, a server, a cluster of servers, a server farm, etc.

As depicted, these computing devices 100*a-c*, 300 and 600 exchange signals conveying data representing indications of the status of providing server-based services through a network 999 of the system 1000. However, one or more of these computing devices may exchange other data entirely unrelated to the provision of such services. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

It should be noted that despite the specific depiction of a quantity of three interaction devices 100*a-c*, any of a variety of quantities of interaction devices may be employed by any number of operators seeking to make use of the services provided by the server 300. Thus, this specific depiction of three interaction devices is but an example to convey that it is envisioned that the server 300 may be employed at any given time to provide services to multiple interaction devices, whatever their exact quantity may be. It should also be noted that despite the depiction of the single network 999 as shared among the interaction devices 100*a-c*, the server 300 and the managing device 600, it is to be understood that alternate embodiments are possible in which the managing device 600 is coupled to the server 300 and/or other servers via a network (or other form of linkage) that is entirely separate from any network employed to couple the server 300 to interaction devices such as the interaction devices 100*a-c*.

In various embodiments, the server 300 incorporates one or more of a processor element 350 (acting as a main processor of the server 300), a storage 360, a randomized timer 312, a timer 313, an interrupt controller 315, a controller 400, and an interface 390 to couple the server 300 to the network 999. The processor element 350 defines a protected location 367 within the storage 360, thus providing hardware-based protection for the integrity of instructions stored therein and executed by the processor element 350 from therein. The storage 360 stores a control routine 370, a key 337 and a status data 339 within the protected location 367. However, multiple virtual machine (VM) sessions 331*x-z* and a control routine 340 are stored within the storage 360 outside the protected location 367. The controller 400 incorporates one or more of a processor element 450 (acting as a controller processor of the controller 400 of the server 300), a storage 460 and one or more health detectors 417. The storage 460 stores a control routine 440 and a status data 439.

It should be noted that despite the specific depiction of a quantity of three VM sessions 331*x-z*, any of a variety of quantities of VM sessions may be instantiated and maintained by the control routine 340, potentially limited only by the capacities of the processor element 350 and the storage 360. Thus, this specific depiction of three VM sessions is but an example to convey that it is envisioned that numerous VM sessions may be instantiated and maintained at any given time within the server 300. It should also be noted that there is not meant to be any specific correspondence between the three depicted interaction devices 100*a-c* and the three depicted VM sessions 331*x-z*. Indeed, it is entirely possible that any given VM session may be associated with multiple interaction devices or no interaction devices coupled to the server 300 at any given time, depending on the nature and degree of use to which any given VM session is put at any given time. Each of the VM sessions 331*x-z* may be employed in the execution of any of a variety of applications software or combination of applications software.

The interrupt controller 315 provides a central collection point and lookup function for hardware and/or software interrupts to be presented to the processor element 350 to temporarily halt execution of one sequence of instructions by the processor element 350 in favor of executing another sequence as those skilled in the art will readily recognize. The randomized timer 312 issues an interrupt (and/or signals the processor element 350 via some other mechanism) upon reaching the end of a randomly selected amount of time. Stated differently, the selected amount of time changes each time the randomized timer 312 is used. In contrast, the timer 313 issues an interrupt (and/or signals the processor element 350 via some other mechanism) upon reaching the end of a specifically selected amount of time. As will be explained in greater detail, the randomized timer 312 and the timer 313 may be caused to cooperate in a manner in which one reaching the end of an amount of time may serve as a trigger for the other to start timing. Upon initialization of the server 300 (e.g., following being powered up or reset), a specified selected time may be provided to the timer 313 and/or these two timers may be provided with an indication of a manner in which they are to cooperate such that one triggers the other. In some embodiments, upon initialization of the server 300, parameters for random selection of an amount of time may be provided to the randomized timer 312 to enable the randomized timer 312 to autonomously derive a new random period of time to count each time it is triggered. In other embodiments, the control routine 370 (within the protected location 367) may derive each new random period of time to count each time the randomized timer 312 is triggered. Alternatively or additionally, the control routine 370 may provide the randomized timer 312 with a period of time selected to cause the end of counting by the randomized timer 312 to coincide with another event such that, at least occasionally, the period of time counted by the randomized timer 312 may not actually be random. Such configuration of one or both of the randomized timer 312 and the timer 313 as may be carried out by the controller 400 (and/or by another mechanism) may be permitted to occur only once following initialization of the server 300, with the configuration rendered unchangeable thereafter until another initialization of the server 300 occurs.

The health detectors 417 are made up of one or more components by which different aspects of the operating condition of the server 300 may be monitored. More specifically, the health detectors 417 may include one or more of thermal sensors monitoring temperatures of various components of the server 300, voltage level sensors monitoring the voltages at which one or more of the components of the server 300 is provided with electric power, bus activity monitors, clock signal monitors, processor thread execution monitors, etc.

The protected location 367 may be made up of one or more ranges of addresses defined by the processor element 350 as subject to relatively tight access restrictions. Such restrictions may include executable instructions stored within the protected location 367 being granted the ability to access data and/or executable instructions relatively freely at other addresses throughout the storage 360, while accesses by other executable instructions from outside the protected location 367 may be greatly limited, or not permitted at all. Alternatively or additionally, executable instructions stored within the protected location 367 may be granted the ability to access a relatively wide selection of components of the server 300 at various address locations, while accesses by other executable instructions outside the protected location 367 may be to a relatively limited selection of components. Upon initialization of the server 300 (e.g., following being powered up or reset), the processor element 350 may be configured to define the address location(s) within the storage 360 that the protected location 367 occupies and/or the extent of the relative access privileges of executable instructions both within and outside of the protected location 367. Such configuration may be carried out by the controller 400 and/or may be permitted to occur only once, with the configuration rendered unchangeable (by the processor element 350 and/or other hardware) thereafter until another initialization of the server 300 occurs. In this way, the protected location 367 cannot surreptitiously be made insecure by malicious software.

The control routine 340 incorporates a sequence of instructions operative on the processor element 350 in its role as a main processor element of the server 300 to implement logic to perform various functions. In executing a sequence of instructions of the control routine 340, the processor element 350 is caused to instantiate, maintain and monitor each of the VM sessions 331x-z. In essence, the control routine 340 implements the logic of a VM monitor (VMM). Within each of the VM sessions 331x-z, applications software or a combination of applications software is executed by the processor element 350 as part of providing server-based computing services for different ones of the interaction devices 100a-c associated with different ones of the VM sessions 331x-z. The control routine 340 causes the processor element 350 to maintain a degree of isolation between each of the VM sessions 331x-z such that applications software executed by the processor element 350 within one of these VM sessions is not permitted by the control routine 340 to cause the processor element 350 to access data or applications software within another of these VM sessions. Upon detection of attempts by executable instructions within one of these VM sessions to cause the processor element 350 to make such an impermissible access, the control routine 340 may cause the processor element 350 to disable the VM session from within which the impermissible access was attempted, remove that VM session, and/or take any of a variety of other actions. Thus, the control routine 340 causes the processor element 350 to provide a degree of security through provision of a degree of isolation between VM sessions.

The control routine 370 also incorporates a sequence of instructions operative on the processor element 350 to implement logic to perform various functions. Execution of the control routine 370 by the processor element 350 is caused by the randomized timer 312 completing counting to the end of (e.g., counting down to) a randomly selected period of time, and then signaling the processor element 350 to temporarily halt execution of the control routine 340 and commence execution of the control routine 370. In executing a sequence of instructions of the control routine 370, the processor element 350 is caused to temporarily disable the interrupt controller 315 (at least partially) so as to preclude being caused to halt execution of the control routine 370 by at least some types of interrupt as may be conveyed to the processor element 350 through the interrupt controller 315. The processor element 350 is then caused to examine the integrity of at least a portion of the control routine 340 in any of a variety of possible ways. In essence, the control routine 370 implements the logic of a VMM watcher. In one possible embodiment, at least a portion of the control routine 340 may be digitally signed and the processor element 350 may be caused by the control routine 370 to cryptographically verify that digital signature using a matching cryptographic key, namely the key 337. Thus, the control routine 370 causes the processor element 350 to provide another degree of security through testing the integrity of the control routine 340 to ensure that the control routine 340 has not been compromised (e.g., altered, augmented or replaced by malicious software).

Whether the processor element 350 is able to verify the integrity of at least a portion of the control routine 340 (by whatever approach) or not, the processor element 350 is then caused by the control routine 370 to indicate the results of its examination in the status data 339, and then to cause the status data 339 to be transmitted to the managing device 600 via the network 999. In some embodiments, the fact of the disabling of the interrupt controller 315 to enable uninterrupted execution of the control routine 370 results in the control routine 370 having to be of a relatively compact size so as to be executable quickly enough to allow a relatively quick re-enabling of the interrupt controller 315 to avoid forestalling responses to interrupts for too long. Thus, in such embodiments, the control routine 370 may not include the instructions required to directly cause the processor element 350 to operate the interface 390 to transmit the status data 339 to the managing device 600. Therefore, in such embodiments, the control routine 370 may cause the processor element 350 to perform such transmission of the status data 339 upon completion of execution of the control routine 370 and resumption of execution of the control routine 340.

Upon completion of at least examining the integrity of the control routine 340, the processor element 350 is caused by the control routine 370 to re-enable the interrupt controller 315, cease execution of the control routine 370 and resume executing the control routine 340. Further, as just discussed, the processor element 350 may now be caused to transmit the status data 339 to the managing device 600, employing instructions incorporated into the control routine 340 to operate the interface 390 to do so. However, it should be noted that if the control routine 340 is indeed compromised or is otherwise malfunctioning, the fact that the control routine 340 is relied upon to cause the processor element 350 to perform the transmission of the status data 339 to the managing device 600 may result in the status data 339 never being transmitted, such that the managing device 600 does not receive it.

The control routine 440 incorporates a sequence of instructions operative on the processor element 450 in its role as a controller processor of the controller 400 to implement logic to perform various functions. Execution of the control routine 440 by the processor element 450 is also caused by the randomized timer 312 completing counting to the end of (e.g., counting down to) a randomly selected period of time. Thus, the completion of counting by the randomized timer 312 is treated as a triggering event that triggers commencement of execution of both the control routines 370 and 440 through the interrupt controller 315 and/or by another mechanism. The completion of the counting by the randomized timer 312 also triggers the start of counting by the timer 313 to the end of a relatively short period of time selected to reflect the relatively short period of time in which the processor element 350 is expected to complete execution of the control routine 370. It is envisioned that the timer 313 is set for an amount of time that is far less than a second, such as 10's or 100's of milliseconds in duration. In contrast, it is envisioned that the randomized timer 312 is either configured with parameters causing it to randomly select periods of time multiple minutes to multiple days in duration or that it is provided with randomly selected periods of time multiple minutes to multiple days in duration. The completion of counting by the randomized timer 312 also results in the processor element 450 being signaled to commence execution of the control routine 440. In executing a sequence of instructions of the control routine 440, the processor element 450 is caused to determine whether or not the processor element 350 completes execution of the control routine 370 before the timer 313 completes counting to the end of its selected period of time. In essence, the control routine 440 implements a VMM watcher verifying function.

If the processor element 350 completes execution of the control routine 370 before the timer 313 completes counting, then the presumption may be made (in some embodiments) that operation of the VMM watcher function of the control routine 370 on the processor element 350 is working correctly. As a result, the presumption may be made that whatever indication of results the processor element 350 is caused to transmit to the managing device 600 in the status data 339 is an accurate evaluation of the integrity of the control routine 340. However, if the timer 313 completes counting before the processor element 350 completes execution of the control routine 370, then the presumption may be made that either a malfunction (hardware or software) has occurred or that the integrity of the control routine 370 has been compromised. In some embodiments, upon having been allowed to complete counting, the timer 313 may be configured to automatically retrigger itself, and this may be treated as a triggering event that retriggers the processor element 350 to again execute the control routine 370. Depending on the cause for earlier failure of execution of the control routine 370 to complete before completion of counting by the timer 313, such retriggering of the processor element 350 to execute the control routine 370 by the timer 313 completing counting may correct the problem. Otherwise, the timer 313 may repeatedly complete counting and repeatedly retrigger itself to count again, which may be detected by the processor element 450 and reported to the managing device 600.

Whether the processor element 350 is able to complete execution of the control routine 370 before the timer 313 completes counting or not, the processor element 450 is caused by the control routine 440 to indicate the results of the efforts of the processor element 350 to do so in the status data 439. The control routine 440 incorporates the instructions required to enable the processor element 450 to operate the interface 390 to transmit the status data 439 to the managing device 600 without assistance from the processor element 350, and the control routine 440 causes the processor element 450 to do so. As a result, each time the randomized timer 312 completes counting to the end of a randomly selected period of time, and regardless of the condition of either of the control routines 340 or 370 such that the managing device 600 may not receive the status data 339, the managing device 600 should still receive the status data 439.

The processor element 450 and the storage 460 define portions of an operating environment within the controller 400 that is substantially separate from the operating environment defined by at least the processor element 350 and the storage 360. This separate operating environment enables the control routine 440 to be executed with a greatly reduced risk of being compromised by other less trustworthy software that may be executed by the processor element 350. The storage of one or more of the status data 439 within the storage 460 further aids in ensuring the integrity of the execution of the control routine 440. Thus, it is envisioned as highly likely that even with corruption of both of the control routines 340 and 370 or a malfunction such that the processor element 350 ceases to effectively execute instructions (e.g., a machine check), the controller 400 should remain functional enough to provide the status data 439 to the managing device 600.

In various embodiments, the managing device 600 incorporates one or more of a processor element 650, a storage 660, and an interface 690 coupling the managing device 600 to the network 999. The storage 660 stores a control routine 640 and one or both of the status data 339 and 439 as received from the server 300. The control routine 640 incorporates a sequence of instructions operative on the processor element 650 to implement logic to perform various functions. In executing a sequence of instructions of the control routine 640, the processor element 650 is caused to evaluate the indications of results of execution of the control routines 370 and 440 by the processor elements 350 and 450, respectively, to determine the status of the server 300. For example, where the status data 339 indicates successful verification of the integrity of the control routine 340, then the processor element 650 is caused to determine that the server 300 is functioning normally and securely.

Alternatively, where the status data 339 is not received at all, but the status data 439 is received, then the processor element 650 is caused to examine what is indicated in the status data 439 to attempt to determine why the status data 339 was not received. Where the status data 439 indicates that the processor element 350 successfully completed execution of the control routine 370 to evaluate the integrity of the control routine 340 before the timer 313 completed counting, then the processor element 650 may be caused to determine that the control routine 340 was either compromised or is malfunctioning sufficiently as to block transmission of the status data 339. Where the status data 439 indicates that the processor element 350 did not successfully complete execution of the control routine 370 before the timer 313 completed counting (e.g., the timer 313 was repeatedly re-triggered and completed counting each time), then the processor element 650 may be caused to determine that at least the control routine 370 is compromised or that the processor element 350 or other component has malfunctioned.

To clarify whether or not the processor element 350 has malfunctioned, the processor element 650 may evaluate one or more indications of the health of the server 300 that may be included in the status data 439. More specifically, between instances of being triggered by the counting down of the randomized timer 312 to monitor execution of the control routine 370, the processor element 450 may be caused to operate one or more of the health detectors 417 to monitor various aspects of the health of the server 300, and to recurringly transmit indications of what is detected regarding the health of the server 300 to the managing device 600 (perhaps as additional ones of the status data 439). Thus, the processor element 450 may be caused to transmit variants of the status data 439 regarding the health of the server 300 to the managing device 600 at more frequent intervals of time than the triggering events generated whenever the randomized timer 312 completes counting.

Such indications of the health of the server 300 may indicate that the processor element 350 had earlier ceased to execute instructions, generally, possibly as a result of entering into an undefined state from which it cannot recover. Alternatively, there may be an indication of a failure to maintain a voltage level of the supply of electric power to the server 300 within specified tolerances such that the processor element 350 and/or other components are functioning intermittently or unpredictably. With the inclusion of such indications of the health of various components of the server 300, a malfunction may be distinguished by the processor element 650 from an instance of a security breach. Depending on what determination the processor element 650 makes concerning the cause for incorrect behavior occurring within the server 300, the processor element 650 may be caused to transmit a command to the server 300 to shut down or reset, and/or the may be caused to present an indication of a problem to personnel responsible for operation of the server 300.

In various embodiments, each of the processor elements 350, 450 and 650 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked.

In various embodiments, each of the storages 360, 460 and 660 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, each of the interfaces 390 and 690 employ any of a wide variety of signaling technologies enabling each of computing devices 300 and 600 to be coupled through the network 999 as has been described. Each of these interfaces includes circuitry providing at least some of the requisite functionality to enable such coupling. However, each of these interfaces may also be at least partially implemented with sequences of instructions executed by corresponding ones of the processor elements 350, 450 and 650 (e.g., to implement a protocol stack or other features). Where one or more portions of the network 999 employs electrically and/or optically conductive cabling, corresponding ones of the interfaces 390 and 690 may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, corresponding ones of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although each of the interfaces 190 and 390 are depicted as a single block, one or more of these may include multiple interfaces that may be based on differing signaling technologies. This may be the case especially where one or more of these interfaces couples corresponding ones of the computing devices 100 and 300 to more than one network, each employing differing communications technologies.

Figure 2:
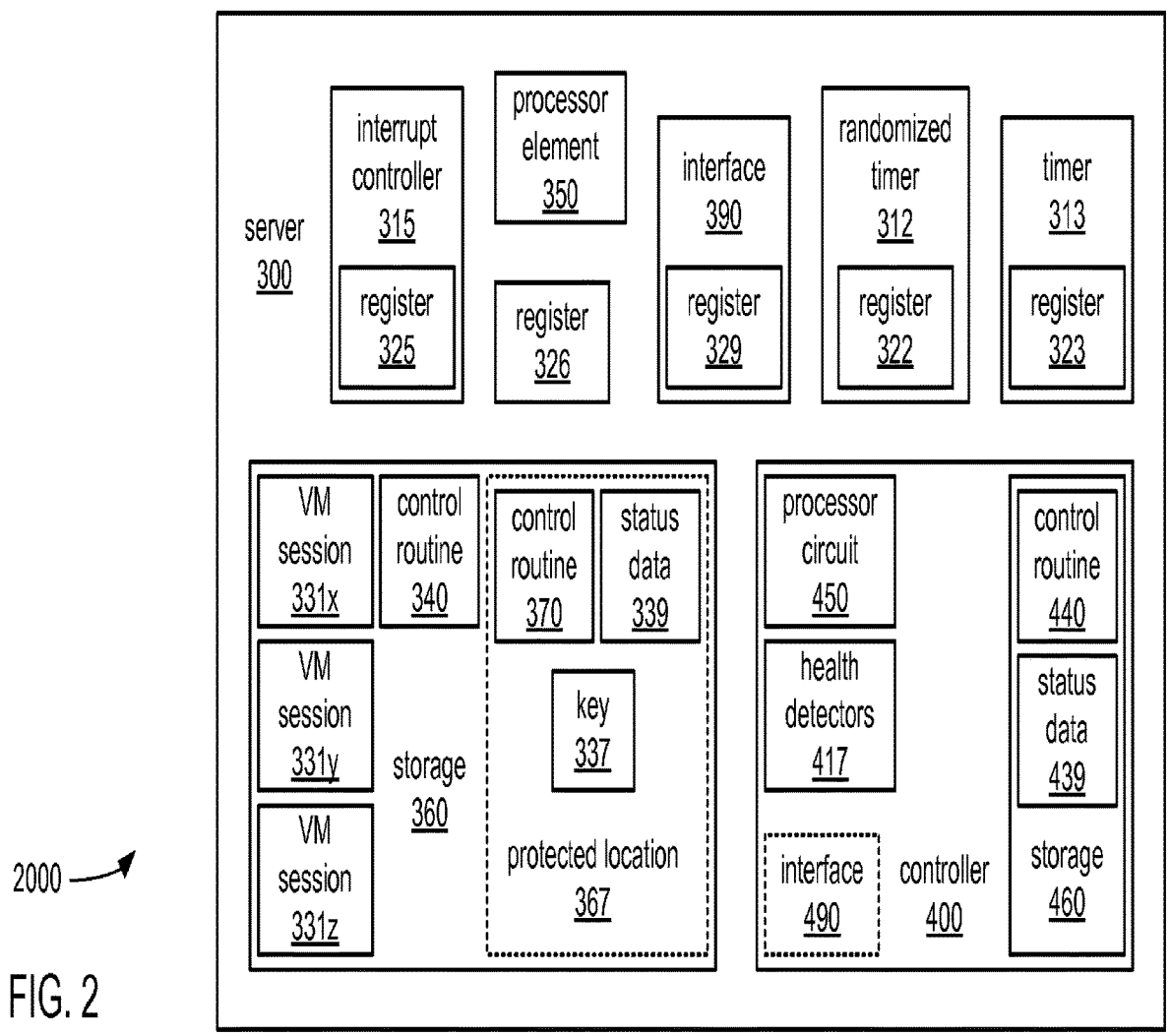
FIGS. 2, 3 and 4 illustrate portions of the embodiment of FIG. 1.

FIG. 2 depicts aspects of a possible implementation of handshaking between components of the server 300 in greater detail. Specifically, the possible inclusion of one or more registers by which some degree of coordination among the processor elements 350 and 450 and/or the timers 312 and 313 may be enabled.

Specifically, in some embodiments, the randomized timer 312 may incorporate a register 322 by which one or both of the processor elements 350 and 450 may be able to monitor its state. Although it is envisioned that the processor element 350 is caused to transition from executing the control routine 340 to executing the control routine 370 through an interrupt triggered by the randomized timer 312 completing a counting of a randomly selected period of time, it may be that the processor element 350 is caused by the control routine 340 to recurringly check the status of the randomized timer 312 by recurringly reading the register 322 to determine if counting of a randomly selected period time has been completed in an alternate embodiment. Indeed, it may be deemed desirable for the processor element 350 to be unable to check the status of the randomized timer 312 in order to avoid providing that information to malicious software that may have succeeded in compromising one or both of the control programs 340 and 370.

Regardless of whether the processor element 350 is able to read the register 322 or not, the processor element 450 may be caused to the control routine 440 to recurringly check the status of the randomized timer 312 by reading the register 322. This may be done possibly to determine when the randomized timer 312 may complete counting to enable the processor element 450 to prepare for monitoring the execution of the control routine 370. Alternatively or additionally, the processor element 450 may be caused to include an indication of the current state of the randomized timer 312 in the status data 439 that it transmits to the managing device 600.

In some embodiments, the timer 313 may incorporate a register 323 by which one or both of the processor elements 350 and 450 may be able to monitor and/or control its state. It may be that the processor element 450 is caused to recurringly monitor the register 323 to determine whether the processor element 350 successfully completes execution of the control routine 370 before the timer 313 completes counting. More specifically, it may be that the processor element 350 is caused to write to the register 323 to cause counting by the timer 313 to stop upon successful completion of the control routine 370. The processor element 450 may recurringly check for an indication in the register 323 of such a write operation by the processor element 350 occurring before the timer completes counting as an indication that the processor element 350 has indeed completed execution of the control routine 370.

In some embodiments, the interrupt controller 315 may incorporate a register 325 by which one or both of the processor elements 350 and 450 may be able to monitor and/or control its state. As previously discussed, it is envisioned that the processor element 350 is caused by the control routine 370 to at least partially disable the interrupt controller 315 to enable uninterrupted execution of the control routine 370. It may be that the register 325 is the mechanism by which this occurs. The register 325 may be among the components accessible to executable instructions stored within the protected location 367 (such as the control routine 370), but not accessible to executable instructions stored outside of the protected location 367 (such as the control routine 340 or a VM session) in order guard against manipulation of the interrupt controller 315 where the control routine 340 has been compromised, but not the control routine 370. The register 325 may also be read by the processor element 450 as it monitors execution of the control routine 370 by the processor element 350. Since disabling the interrupt controller 315 is envisioned as one of the first actions of the processor element 350 in commencing execution of the control routine 370 and re-enabling the interrupt controller 315 is envisioned as one of the last actions in ceasing to execute the control routine 370, the processor element 450 may monitor the register 325 to determine whether either the disabling or re-enabling of the interrupt controller 315 has occurred as part of the information gathered for inclusion in the status data 439.

In some embodiments, a register 326 may be incorporated into the server 300 (possibly into the processor element 350) as part of a mechanism to exchange information between instances of executing one or the other of the control routines 340 and 370. Specifically, the processor element 350 may be caused by execution of the control routine 370 to write the register 326 with a value indicating an address location at which the status data 339 is stored so that the processor element will be able to locate the status data 339 upon resuming execution of the control routine 340 to enable transmission of the status data 339 to the managing device 600.

In some embodiments, the interface 390 may incorporate a register 329 by which one or both of the processor elements 350 and 450 may be able to monitor and/or control its state. Specifically, the processor element 450 may be caused by the control routine 440 to read the register 329 for an indication of whether or not the processor element 350 was caused by the control routine 340 to at least attempt to transmit the status data 339 to the managing device 600 upon resumption of execution of the control routine 340.

Figure 3:
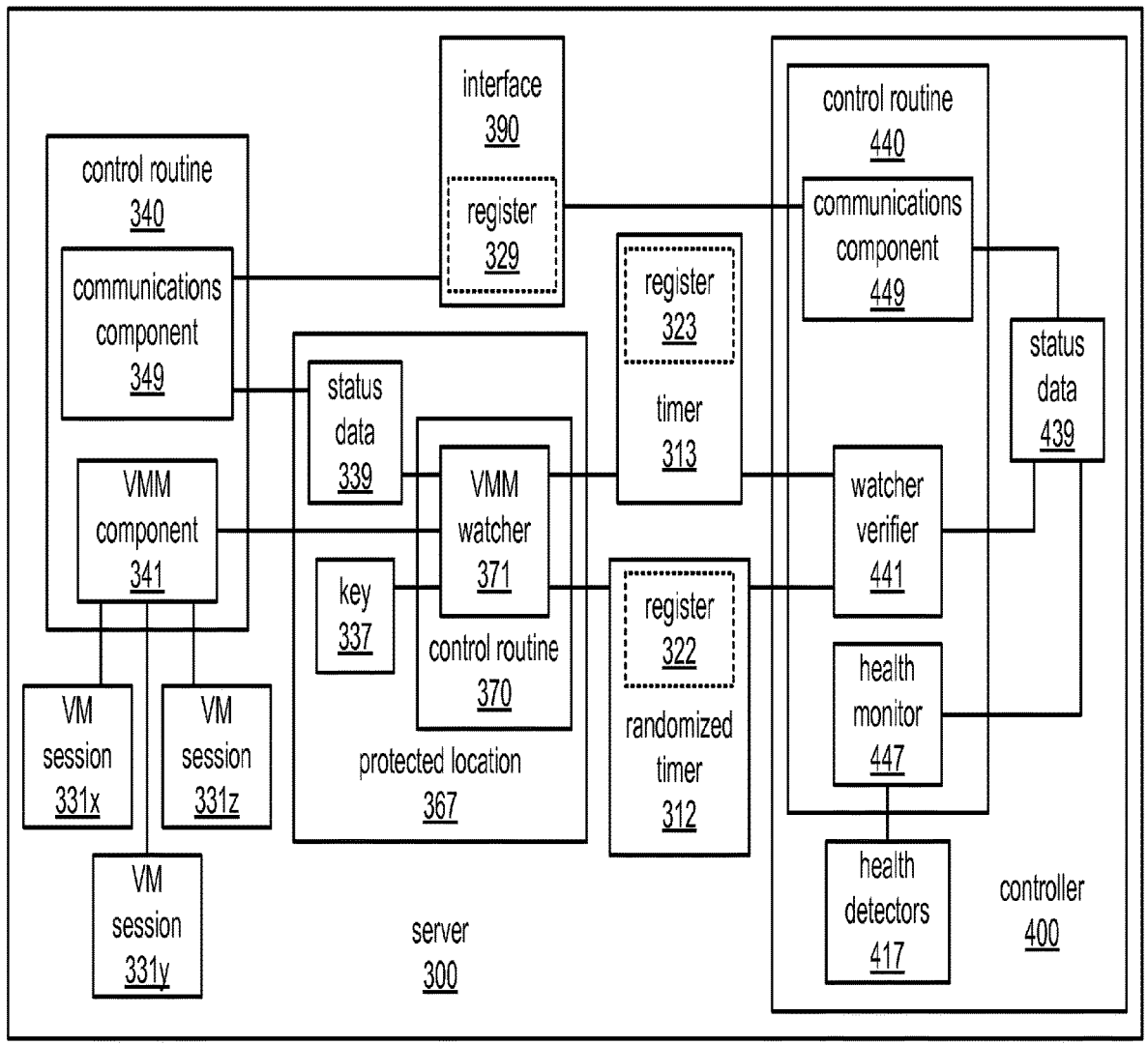

FIG. 3 illustrates a block diagram of a portion of the block diagram of FIG. 1 in greater detail. More specifically, aspects of the operating environments of the computing device 300 and the controller 400 are depicted, in which the processor elements 350 and 450 are caused by execution of corresponding ones of the control routines 340, 370 and 440 to perform the aforedescribed functions. As will be recognized by those skilled in the art, each of these control routines, including the components of which each is composed, is selected to be operative on whatever type of processor or processors that are selected to implement corresponding ones of each of these processor elements.

In various embodiments, each of the control routines 340, 370 and 440 may include a combination of an operating system, device drivers and/or application-level routines (e.g., so-called "software suites" provided on disc media, "applets" obtained from a remote server, etc.). Where an operating system is included, the operating system may be any of a variety of available operating systems, including without limitation, Windows™, OS X™, Linux®, or Android OS™. Where one or more device drivers are included, those device drivers may provide support for any of a variety of other components, whether hardware or software components, of the computing device 300 and the controller 400.

Each of the control routines 340 and 440 includes a communications component 349 and 449 executable by the processor elements 350 and 450 to operate the interfaces 390 and 490, respectively, to transmit and receive signals via the network 999 (or other linkages) as has been described. As will be recognized by those skilled in the art, each of these communications components is selected to be operable with whatever type of interface technology is selected to implement a corresponding one of these interfaces.

The control routine 340 includes a VMM component 341 executable by the processor element 350 to instantiate, maintain and monitor VM sessions (e.g., the VM sessions 331a-c). The VMM component 341 provides a degree of security between the executing of applications software within different VM sessions by not permitting accesses therebetween. Further, the VMM component 341 may act in response to detecting attempts to make such impermissible accesses by disabling or removing a VM session from which such an access was attempted, as has been discussed.

The control routine 370 includes a VMM watcher 371 executable by the processor element 350 in response to the triggering event of the randomized timer 312 completing its counting down to the end of a randomly selected period of time to check the integrity of at least a portion of the control routine 340 (e.g., the VMM component 341). Among the techniques the VMM watcher 371 may employ to do so, the VMM watcher 371 may employ the key 337 to check a digital signature embedded within at least that portion of the control routine 340. With the VMM watcher 371 and the key 337 stored within the protected location 367, some degree of protection is provided from being compromised by malicious software stored outside the protected location 367.

The control routine 440 includes a watcher verifier 441 executable by the processor element 450 in response to the triggering event of the randomized timer 312 completing its counting down to the end of a randomly selected period of time to monitor execution of the control routine 370 to determine whether it is successfully executed by the processor element 350 before the timer 312 (also triggered by the completed counting down of the randomized timer 312) completes counting down. The watcher verifier 441 then records the results (whatever they are) in the status data 439 to be transmitted to the managing device 600.

The control routine 440 includes a health monitor 447 executable by the processor element 450 to recurringly operate one or more of the health sensors 417 to detect indications of the health (operating condition) of the server 300. As has been discussed, it is envisioned that indications of the health of the server 300 are recorded in variants of the status data 439 that are sent at times other than occasions linked to monitoring of the processor element 350 executing the control routine 370 such that the managing device 600 receives indications of the health of the server 300 was some degree of frequency.

Figure 4:
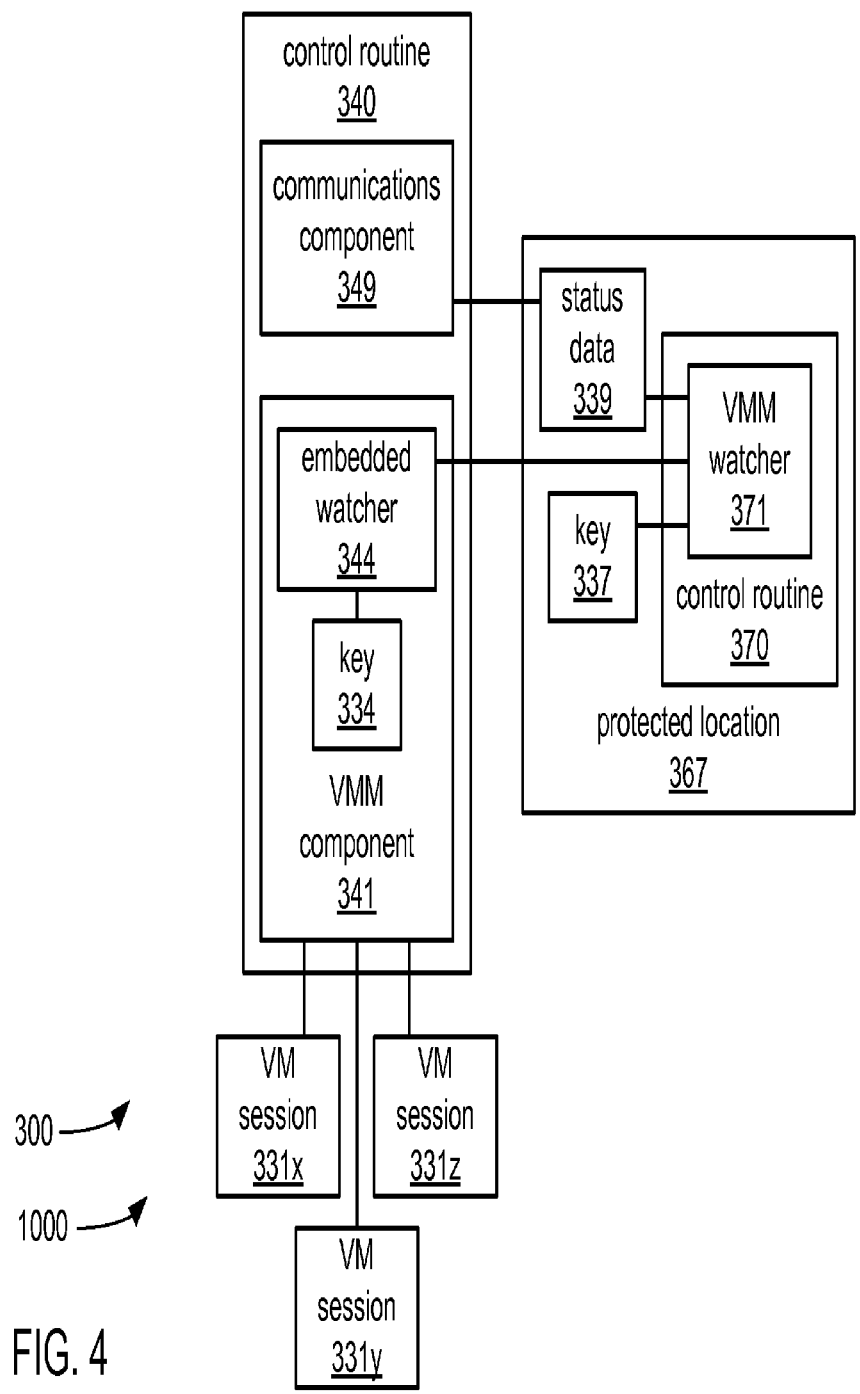

FIG. 4 illustrates a block diagram of a variation of the control routines 340 and 370 as depicted in FIG. 3. For sake of clarity of depiction and discussion, depictions of numerous other components of the server 300 that were also depicted in FIG. 3 are omitted in FIG. 4. In the variation of the control routine 340 of FIG. 4 (as compared to its counterpart in FIG. 3), the VMM component additionally incorporates an embedded watcher 344 and a key 334. Also, the variation of the control routine 370 of FIG. 4, the VMM watcher 371 checks the integrity of the embedded watcher 344 (and perhaps also of the key 334) to verify that the embedded watcher 344 has not been compromised. Presuming that the embedded watcher 344 is so verified, then an indication for the embedded watcher 344 to be executed is conveyed across the transition between the processor element executing the control routine 370 and executing the control routine 340. Upon being executed by the processor element 350, the embedded watcher 344 performs an integrity check on another portion of the control routine 340 (perhaps the rest of the VMM component 341), possibly using the key 334 in a cryptographic check of an embedded digital signature. This may be done where the amount of time available for execution of the control routine 370 is sufficiently short that an effective verification of the integrity of the control routine 340 and/or the VMM component 341 thereof cannot be done. In such instances, verification of a relatively small embedded watcher of the control routine 340 may be feasible. Successful verification of the integrity of the embedded watcher 344 may enable the embedded watcher 344 to be deemed sufficiently trustworthy to perform an integrity check of more of the control routine 340.

Figure 5:
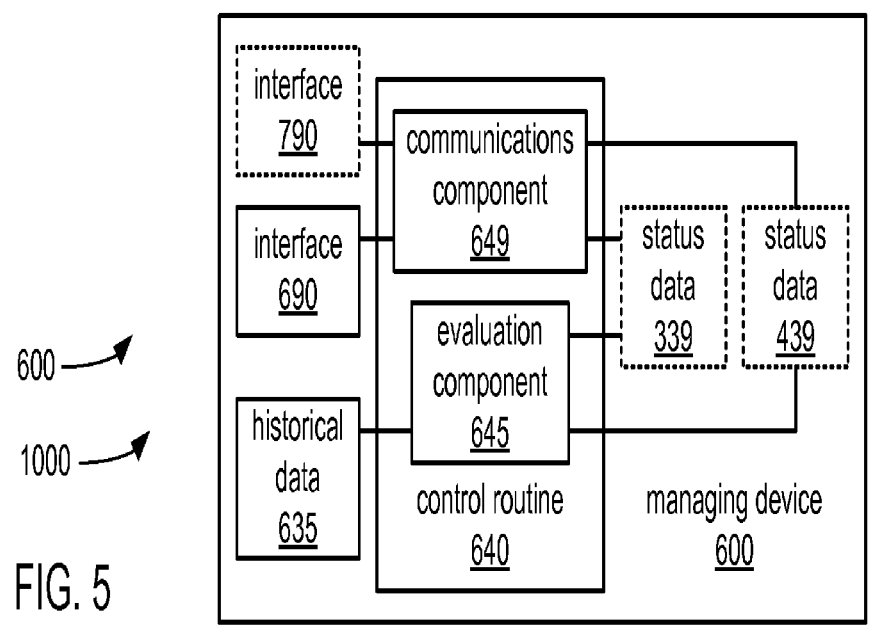
FIG. 5 illustrates a variant of the portion of FIG. 3.

FIG. 5 illustrates another block diagram of a portion of the block diagram of FIG. 1 in greater detail. More specifically, aspects of the operating environment of the computing device 600 is depicted, in which the processor element 650 is caused by execution of the control routine 640 to perform the aforedescribed functions. As will be recognized by those skilled in the art, this control routine, including the components of which it is composed, is selected to be operative on whatever type of processor or processors that are selected to implement this processor element.

In various embodiments, the control routine 640 may include a combination of an operating system, device drivers and/or application-level routines (e.g., so-called "software suites" provided on disc media, "applets" obtained from a remote server, etc.). Where an operating system is included, the operating system may be any of a variety of available operating systems, including without limitation, Windows™, OS X™, Linux®, or Android OS™. Where one or more device drivers are included, those device drivers may provide support for any of a variety of other components, whether hardware or software components, of the computing device 600.

The control routine 640 includes a communications component 649 executable by the processor element 650 to operate the interface 690, and possibly also an interface 790, to transmit and receive signals via the network 999 and/or another linkage between the computing devices 300 and 600 as has been described. As has been discussed, the controller 400 of the server 300 may employ a separate interface 490 for communications with the managing device 600, and as depicted in FIG. 5, the managing device 600 may employ a separate interface 790 to support such communication via an entirely separate link with that interface 490. As will be recognized by those skilled in the art, this communications component is selected to be operable with whatever type of interface technology is selected to implement one or both of these interfaces.

The control routine 640 includes an evaluation component 645 executable by the processor element 650 to analyze the status data 339 (if received) and the status data 439. In response to receiving an indication of trouble in the processor element attempting to verify the integrity of the control routine 340, the evaluation component 645 examines the indications of the health of the server 300 received from the controller 400 in the status data 439. The evaluation component 645 also examines what is indicated in the status data 339, if received. Further, the evaluation component 645 may examine past indications of the health of the server 300 received from the controller 400 and stored in a historical data 635. The evaluation component 645 then determines whether a malfunction has occurred that can be corrected by reinitializing the server 300, whether a malfunction requiring repair of the server 300 has occurred, or whether integrity of one or both of the control routines 340 (including the VMM component 341) and 370 has been compromised.

Figure 6:
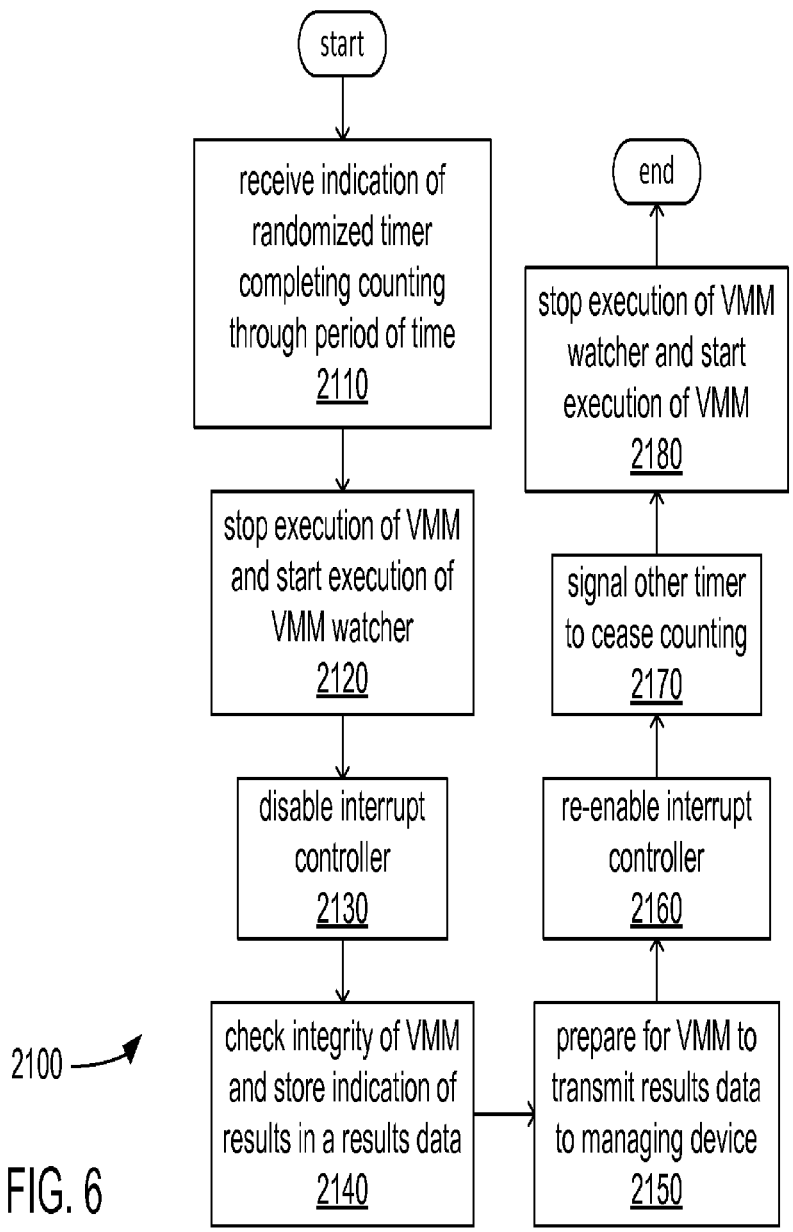
FIG. 6 illustrates an embodiment of a first logic flow.

FIG. 6 illustrates one embodiment of a logic flow 2100. The logic flow 2100 may be representative of some or all of the operations executed by one or more embodiments described herein. More specifically, the logic flow 2100 may illustrate operations performed by the processor element 350 in executing at least the control routines 340 and/or 370, and/or performed by other component(s) of the server 300.

At 2110, a main processor element of a server (e.g., the processor element 350 of the server 300) receives an indication of a randomized timer of the server reaching the end of (e.g., counting down through) a randomly selected period of time. As has been discussed, upon initialization of the server (e.g., following being powered up or reset), the randomized timer may be given parameters for randomly selecting the length of each new period of time, and those settings may locked upon being set such that they cannot be changed without a re-initialization of the server.

At 2120, in response to this timer event, the main processor element ceases executing a VMM (e.g., the VMM 341 of the control routine 340), and commences execution of a VMM watcher (e.g., the VMM watcher 371 of the control routine 370) to check the integrity of at least the VMM. As has been described, the reaching of the end of the period of time by the randomized timer may trigger an interrupt as the mechanism of triggering the main processor element to make this change in execution. Alternatively, a register of the randomized timer may be monitored by the main processor element.

At 2130, the main processor element at least partially disables an interrupt controller of the server to enable execution of the VMM watcher substantially uninterrupted.

At 2140, the main processor element checks the integrity of the VMM, possibly through the use of a cryptographic key to check a digital signature embedded within the VMM, and stores an indication of the results of that check as a results data for transmission to a managing device (e.g., the managing device 600).

At 2150, the main processor element arranges for the VMM to transmit the results data to the managing device once the main processor element ceases executing the VMM watcher and resumes executing the VMM. As has been discussed, a handshake mechanism may be employed in which an indication of a location at which the results data is stored is passed between the executions of the VMM watcher and the VMM, possibly through a register.

At 2160, the main processor element re-enables the interrupt controller, and signals another timer to cease counting at 2170. As has been discussed, just as the reaching of a randomly selected period of time by the randomized timer serves as a triggering event to cause the main processor element to switch from executing the VMM to executing the VMM watcher, it also serves as a trigger to start a counting down of another time period by another counter. This other counter serves as a "watchdog timer" for the amount of time it takes the main processor element to successfully complete execution of the VMM watcher. By signaling the other timer to cease counting, the main processor element conveys an indication that it has completed execution of the VMM watcher.

At 2180, the main processor ceases execution of the VMM watcher and resumes execution of the VMM. As has been discussed, it is at this point that transmission of the results data should occur, and that this may be due to the VMM watcher having to be executed within such time constraints that it does not incorporate the executable instructions to operate an interface to transmit the results data to the managing device, itself.

Figure 7:
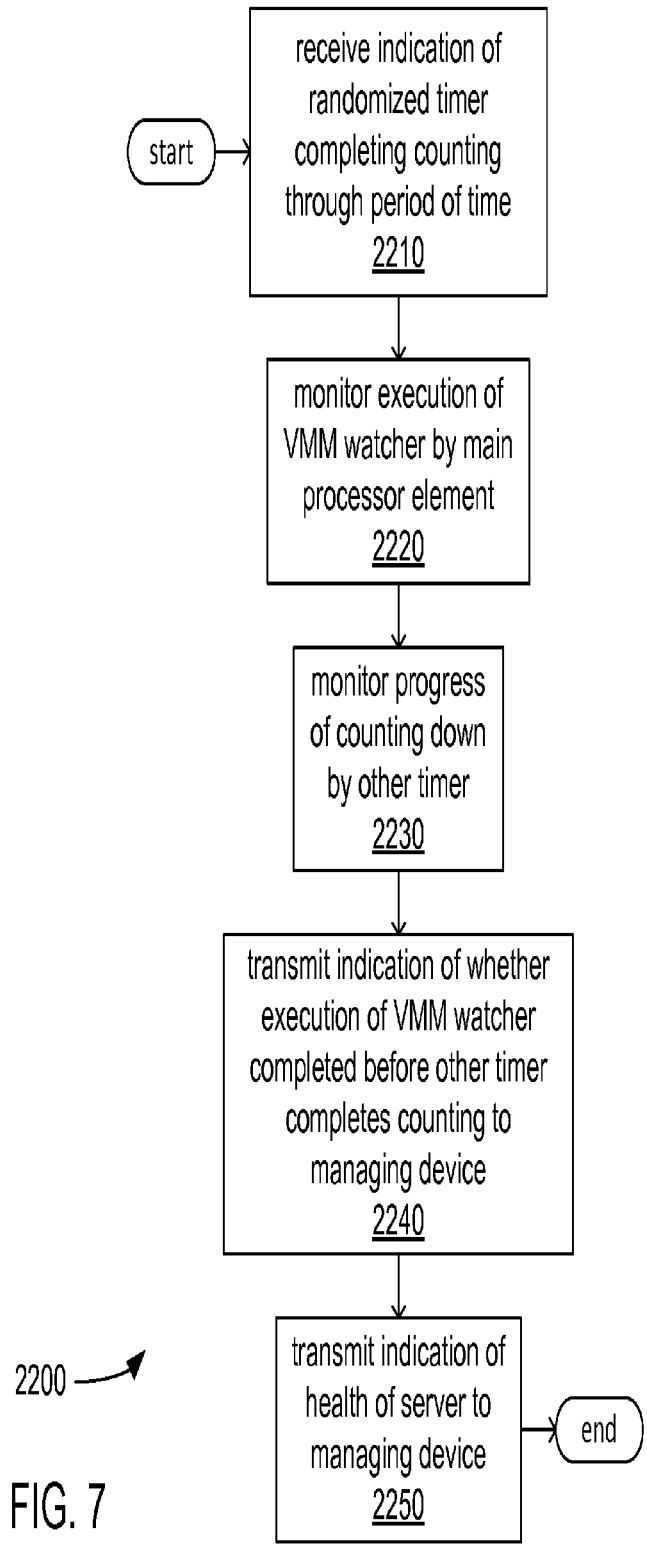
FIG. 7 illustrates an embodiment of a second logic flow.

FIG. 7 illustrates one embodiment of a logic flow 2200. The logic flow 2200 may be representative of some or all of the operations executed by one or more embodiments described herein. More specifically, the logic flow 2200 may illustrate operations performed by the processor element 450 in executing at least the control routine 440, and/or performed by other component(s) of the controller 400.

At 2210, a controller processor element of a server (e.g., the processor element 450 of the controller 400 of the server 300) receives an indication of a randomized timer of the server reaching the end of (e.g., counting down through) a randomly selected period of time. As has been discussed, upon initialization of the server (e.g., following being powered up or reset), the randomized timer may be given parameters for randomly selecting the length of each new period of time, and those settings may locked upon being set such that they cannot be changed without a re-initialization of the server.

At 2220, the controller processor monitors execution of a VMM watcher by a main processor element of the server (e.g., execution of the VMM watcher 371 of the control routine 370 by the processor element 350). As has been discussed, the controller processor may employ various techniques to monitor such execution, including and not limited to, monitoring registers of an interrupt controller and/or an interface to determine if stages have yet been reached where the state of one or the other is changed. At 2230, the controller processor also monitors a counting down of another timer serving as a "watchdog" timer to time the execution of the VMM watcher by the main processor element.

At 2240, the controller processor element transmits an indication of whether execution of the VMM watcher by the main processor element was completed before the other time completed counting down or not to a managing device (e.g., the managing device 600). At 2250, the controller processor element also transmits an indication of the health of the server to the managing device. As has been discussed, indications of the health of the server may be transmitted to the managing device more frequently than indications of whether the VMM watcher was executed before the other timer completed counting down or not. Further, on occasions where the results of execution of the VMM watcher are transmitted, those results may be combined with a transmission of an indication of the health of the server.

Figure 8:
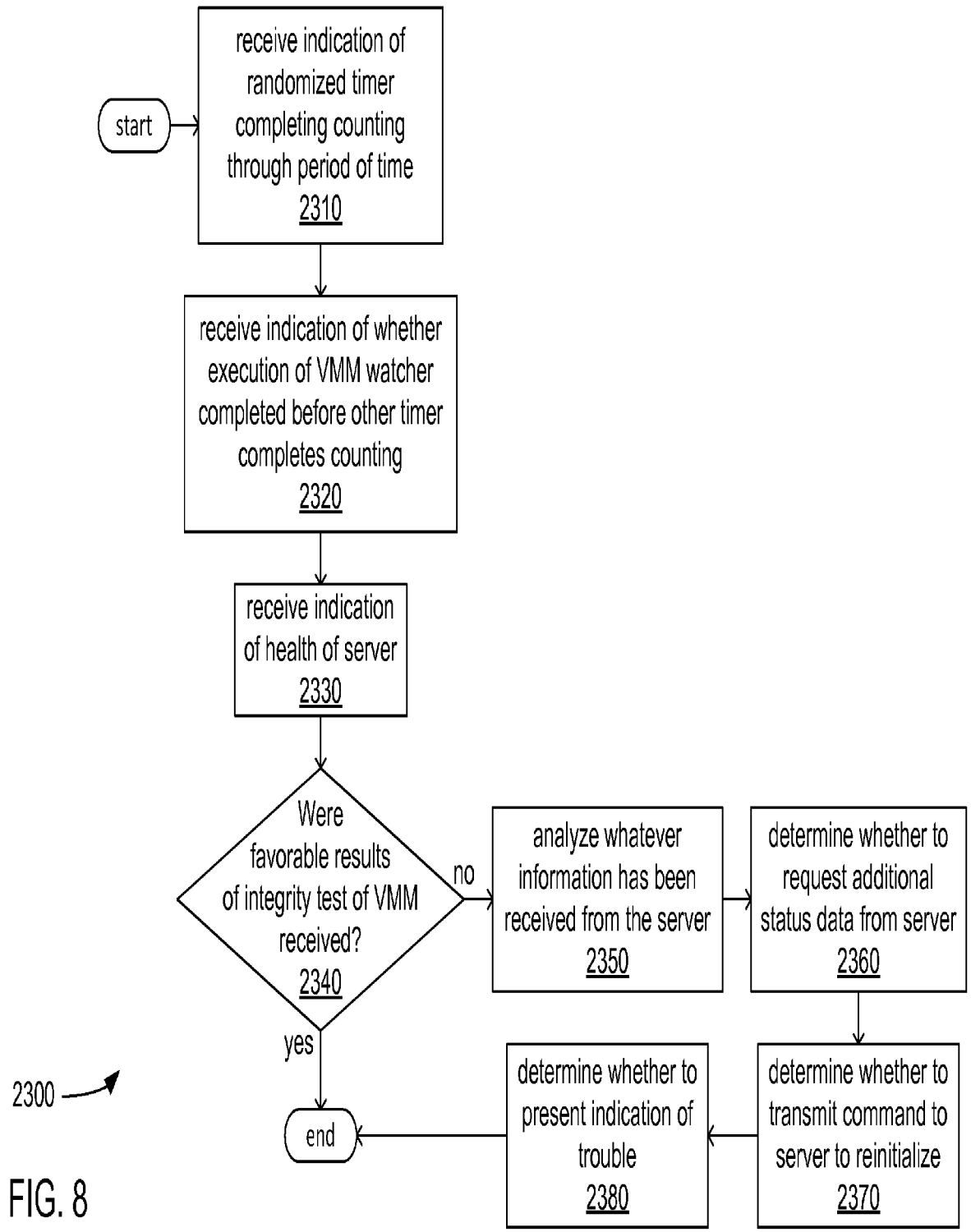
FIG. 8 illustrates an embodiment of a third logic flow.

FIG. 8 illustrates one embodiment of a logic flow 2300. The logic flow 2300 may be representative of some or all of the operations executed by one or more embodiments described herein. More specifically, the logic flow 2300 may illustrate operations performed by the processor element 650 of the in executing at least the control routine 640, and/or performed by other component(s) of the managing device 600.

At 2310, a managing device (e.g., the managing device 600) receives an indication of a randomized timer of a server reaching the end of (e.g., counting down through) a randomly selected period of time (e.g., the randomized timer 312 of the server 300). At 2320, the managing device receives an indication of whether a main processor element of the server (e.g., the processor element 350) has successfully completed execution of a VMM watcher (e.g., the VMM watcher 371 of the control routine 370) before another timer of the server (e.g., the timer 313) completes counting down. At 2330, the managing device 600 receives an indication of the health of the server. These various indications may be received together within a common results data (e.g., the results data 439) or may be received in separate transmissions made by a controller of the server (e.g., the controller 400) via a network or other linkage therebetween. As has been discussed, the controller may be coupled to the managing device for transmitting such indications via a network or other linkage that is entirely separate from a network by which the main processor element of the server may communicate with the managing device.

At 2340, a check is made as to whether or not a results data indicating favorable results of a check of the integrity of a VMM component (e.g., the VMM component 341 of the control routine 340) by the main processor element has been received. If either no results data (favorable or otherwise) is received, or if results data indicating unfavorable results are received, then the managing device analyzes the information that has been received from either of its main processor element or its controller at 2350.

Following analysis at 2350, the managing device determines whether to request additional status information from the server such as indications of current register settings, contents of storage at particular locations, etc. to enable further analysis of what has happened at 2360. At 2370, the managing device determines whether to transmit a command to the server to reinitialize. If the indications of the health of the server do not show the occurrence of a problem requiring repair of the server (e.g., malfunctioning cooling or continuing provision of electric power with voltages outside specifications), then restarting the server may overcome the current problem. At 2380, the managing device determines whether to present an indication to personnel of a problem with the server (e.g., a visually presenting an indication on a display).

Figure 9:
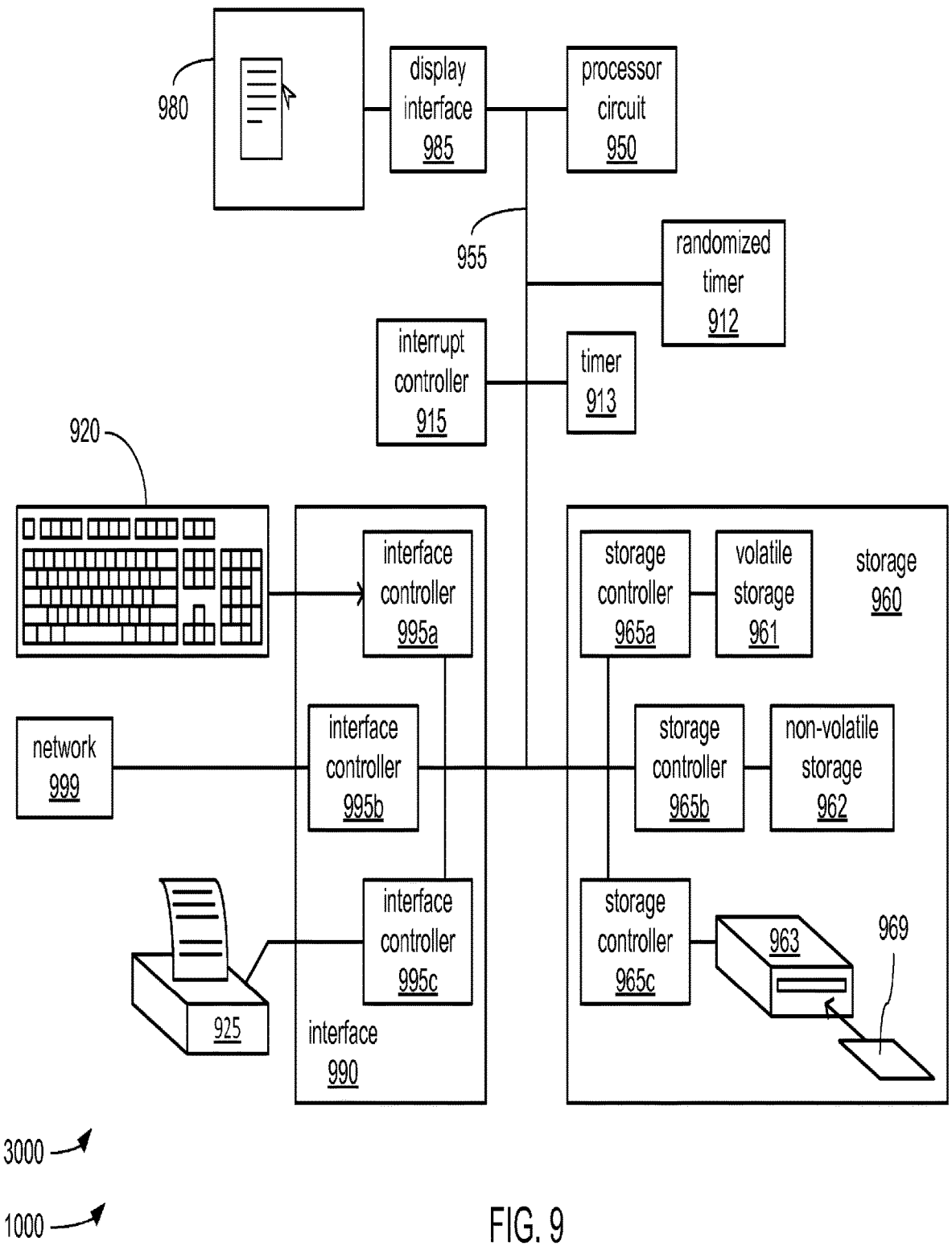
FIG. 9 illustrates an embodiment of a processing architecture.

FIG. 9 illustrates an embodiment of an exemplary processing architecture 3000 suitable for implementing various embodiments as previously described. More specifically, the processing architecture 3000 (or variants thereof) may be implemented as part of one or more of the computing devices 300 and 600. It should be noted that components of the processing architecture 3000 are given reference numbers in which the last two digits correspond to the last two digits of reference numbers of components earlier depicted and described as part of each of the computing devices 300 and 600. This is done as an aid to correlating such components of whichever ones of the computing devices 300 and 600 may employ this exemplary processing architecture in various embodiments.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 950, a storage 960, an interface 990 to other devices, and coupling 955. Depending on various aspects of a computing device implementing the processing architecture 3000, including its intended use and/or conditions of use, such a computing device may further incorporate additional components, such as without limitation, a randomized timer 912, a timer 913 and/or an interrupt controller 915.

The coupling 955 incorporates one or more buses, point-to-point interconnects, transceivers, buffers, crosspoint switches, and/or other conductors and/or logic that communicatively couples at least the processor element 950 to the storage 960. The coupling 955 may further couple the processor element 950 to one or more of the interface 990 and the display interface 985 (depending on which of these and/or other components are also present). With the processor element 950 being so coupled by couplings 955, the processor element 950 is able to perform the various ones of the tasks described at length, above, for whichever ones of the computing devices 200 and 700 implement the processing architecture 3000. The coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor element 950 (corresponding to one or more of the processor elements 350, 450, 650 and 750) may include any of a wide variety of commercially available processors, employing any of a wide variety of technologies and implemented with one or more cores physically combined in any of a number of ways.

As previously discussed, the storage 960 (corresponding to one or more of the storages 360, 460 and 660) may include one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly comprising multiple distinct types of storage is in recognition of the commonplace use of more than one type of storage device in computing devices in which one type provides relatively rapid reading and writing capabilities enabling more rapid manipulation of data by the processor element 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of removable machine-readable storage media 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage media 969.

One or the other of the volatile storage 961 or the non-volatile storage 962 may include an article of manufacture in the form of a machine-readable storage media on which a routine comprising a sequence of instructions executable by the processor element 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 950 may initially be stored on the machine-readable storage media 969, and the removable media storage 963 may be subsequently employed in copying that routine to the non-volatile storage 962 for longer term storage not requiring the continuing presence of the machine-readable storage media 969 and/or the volatile storage 961 to enable more rapid access by the processor element 950 as that routine is executed.

As previously discussed, the interface 990 (corresponding to one or more of the interfaces 390, 490, 690 and 790) may employ any of a variety of signaling technologies corresponding to any of a variety of communications technologies that may be employed to communicatively couple a computing device to one or more other devices. Again, one or both of various forms of wired or wireless signaling may be employed to enable the processor element 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995*c* may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also incorporate the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices 200 and 700 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

An example of an apparatus to monitor virtual machine integrity includes a first processor element; and first logic to receive an indication that a first timer has reached an end of a first period of time, monitor execution of a virtual machine monitor (VMM) watcher by a second processor element, determine whether the second processor element completes execution of the VMM watcher to verify integrity of a VMM before a second timer reaches an end of a second period of time, and transmit an indication of the determination to a computing device.

The above example of an apparatus in which the first logic is to monitor a state of an interrupt controller to monitor execution of the VMM watcher by the second processor element, and determine whether the second processor element has re-enabled the interrupt controller.

Either of the above examples of an apparatus in which the first logic is to monitor a state of the second timer to monitor execution of the VMM watcher by the second processor element, and determine whether the second processor element has stopped the second timer to indicate completion of execution of the VMM watcher.

Any of the above examples of an apparatus in which the first logic is to monitor a health detector of a server comprising the health detector, and the first and second processor elements, and transmit an indication to the computing device of the health of the server.

Any of the above examples of an apparatus in which the health detector includes one of a thermal sensor, a voltage sensor, a bus activity monitor and clock signal monitor.

Any of the above examples of an apparatus in which the apparatus includes the second processor element and an interrupt controller; and the VMM watcher includes a second logic to write to a register of the interrupt controller to re-enable the interrupt controller, cease execution of the VMM watcher, and execute the VMM.

Any of the above examples of an apparatus in which the apparatus includes the second processor; and the VMM watcher includes a second logic to arrange a results data that indicates results of verification of integrity of the VMM to be transmitted to the computing device during execution of the VMM, and cause cessation of execution of the VMM watcher and commencement of execution of the VMM.

Any of the above examples of an apparatus in which the apparatus includes the first timer, and the first timer includes a randomized timer to randomly select a duration of the first period of time.

Any of the above examples of an apparatus in which the apparatus includes the second processor element, and the VMM watcher includes a second logic to use a key to verify a digital signature embedded in the VMM.

Any of the above examples of an apparatus in which the apparatus includes the second processor element, and the VMM watcher includes a second logic to write to a register of the second timer to stop the second timer to indicate completion of the VMM watcher.

An example of another apparatus to monitor virtual machine integrity includes a processor element; a first interface to couple the processor element to a server; and logic to receive an indication that a first timer of the server has reached an end of a first period of time, receive a first results data that indicates whether a VMM watcher to verify integrity of a VMM was executed by a processor element of the server before a second timer of the server reached an end of a second period of time, and await receipt of a second results data that indicates the results of the verification.

The above example of another apparatus in which the logic is to analyze at least the first results data to determine a cause for lack of receipt of the second results data in response to the lack of receipt of the second results data from the server.

Either of the above examples of another apparatus in which the logic is to receive an indication of health of the server comprising at least one of a temperature of a component of the server, a voltage level of a supply of electric power to the server, an indication of activity of a bus of the server, an indication of an uncorrected array/logic error, and an indication of presence or absence of a clock signal of the server.

Any of the above examples of another apparatus in which the logic is to determine whether to signal a controller of the server to reinitialize the server.

Any of the above examples of another apparatus in which the logic is to present an indication of a need to repair the server in response to the indication of the health of the server.

Any of the above examples of another apparatus in which the apparatus includes a display, and the logic is to visually present an indication of the integrity of the VMM as compromised in response to receipt of the second results indicating that the integrity of the of the VMM is not verified by the VMM watcher.

An example of a computer-implemented method of monitoring virtual machine integrity includes receiving an indication that a first timer of a server has reached an end of a first period of time, monitoring execution of a VMM (virtual machine monitor) watcher by a main processor element of the server, determining whether the main processor element completes execution of the VMM watcher to verify integrity of a VMM of the server before a second timer of the server reaches an end of a second period of time, monitoring at least one detector of a health status of the server, and transmitting a results data indicating the health status and the determination to a computing device.

The above example of a computer-implemented method in which the method includes monitoring a state of an interrupt controller of the server to monitor execution of the VMM watcher by the main processor element, and determining whether the main processor element has re-enabled the interrupt controller.

Either of the above examples of a computer-implemented method in which the method includes writing to a register of the interrupt controller to re-enable the interrupt controller following verification of the integrity of the VMM.

Any of the above examples of a computer-implemented method in which the method includes monitoring a state of the second timer to monitor execution of the VMM watcher by the main processor element, and determining whether the main processor element has stopped the second timer to indicate completion of execution of the VMM watcher.

Any of the above examples of a computer-implemented method in which the method includes writing to a register of the second timer to stop the timer to indicate completion of the VMM watcher.

Any of the above examples of a computer-implemented method in which the method includes at least one of a temperature of a component of the server, a voltage level of a supply of electric power to the server, an indication of activity of a bus of the server, an indication of an uncorrected array/logic error, and an indication of presence or absence of a clock signal of the server.

Any of the above examples of a computer-implemented method in which the method includes using a key to verify a digital signature embedded in the VMM.

An example of an apparatus to virtual machine integrity includes means for performing any of the above examples of a computer-implemented method.

An example of at least one machine-readable storage medium includes instructions that when executed by a computing device, cause the computing device to receive an indication that a first timer of the computing device has reached an end of a first period of time, monitor execution of a VMM (virtual machine monitor) watcher by a main processor element of the computing device, determine whether the main processor element completes execution of the VMM watcher to verify integrity of a VMM of the computing device before a second timer of the computing device reaches an end of a second period of time, and transmit a results data indicating the determination to another computing device.

The above example of at least one machine-readable storage medium in which the computing device is caused to monitor at least one detector of a health status of the computing device, and include an indication of the health status in the results data.

Either of the above examples of at least one machine-readable storage medium in which the health status includes at least one of a temperature of a component of the computing device, a voltage level of a supply of electric power to the computing device, an indication of activity of a bus of the computing device, an indication of an uncorrected array/logic error, and an indication of presence or absence of a clock signal of the computing device.

Any of the above examples of at least one machine-readable storage medium in which the computing device is caused to monitor a state of an interrupt controller of the computing device to monitor execution of the VMM watcher by the main processor element, and determine whether the main processor element has re-enabled the interrupt controller.

Any of the above examples of at least one machine-readable storage medium in which the computing device is caused to monitor a state of the second timer to monitor execution of the VMM watcher by the main processor element, and determine whether the main processor element has stopped the second timer to indicate completion of execution of the VMM watcher.

An example of still another apparatus to monitor virtual machine integrity includes means for receiving an indication that a first timer of the computing device has reached an end of a first period of time, monitoring execution of a VMM (virtual machine monitor) watcher by a main processor element of the computing device, determining whether the main processor element completes execution of the VMM watcher to verify integrity of a VMM of the computing device before a second timer of the computing device reaches an end of a second period of time, and transmitting a results data indicating the determination to another computing device.

The above example of still another apparatus in which the apparatus includes means for monitoring at least one detector of a health status of the computing device, and including an indication of the health status in the results data.

Either of the above examples of still another apparatus in which the health status include at least one of a temperature of a component of the computing device, a voltage level of a supply of electric power to the computing device, an indication of activity of a bus of the computing device, an indication of an uncorrected array/logic error, and an indication of presence or absence of a clock signal of the computing device.

Any of the above examples of still another apparatus in which the apparatus includes means for monitor a state of an interrupt controller of the computing device to monitor execution of the VMM watcher by the main processor element, and determine whether the main processor element has re-enabled the interrupt controller.

Any of the above examples of still another apparatus in which the apparatus includes means for monitor a state of the second timer to monitor execution of the VMM watcher by the main processor element, and determine whether the main processor element has stopped the second timer to indicate completion of execution of the VMM watcher.

The invention claimed is:

1. An apparatus, comprising:
   a server, comprising:
      a server processor; and
      server memory coupled to the server processor, the server memory comprising instructions that when executed by the server processor cause the server processor to:
         receive a time-related indication that indicates a first timer has reached an end of a first period of time,
         cease, responsive to the time-related indication, execution of a virtual machine monitor (VMM) and commence execution of a VMM watcher,
         disable, at least partially, an interrupt controller responsive to commencement of execution of the VMM watcher, and
         monitor execution of the VMM watcher; and
   a device, comprising:
      a device processor; and
      device memory comprising instructions that when executed by the device processor cause the device processor to:
         identify a first indication from a first health detector, the first indication associated with a first operating condition of the server monitored by the first health detector,
         identify a second indication from a second health detector, the second indication associated with a second operating condition of the server monitored by the second health detector,
         identify a third indication from the VMM watcher, the third indication associated with completion of an integrity verification routine in a predefined time, and
         distinguish between malfunction, security breach, and normal operation in the server based on the first indication, the second indication, and the third indication.

2. The apparatus of claim 1, the first health detector comprising one or more of a temperature sensor and a voltage sensor and the second health detector comprising one or more of a bus activity, clock signal, and device processor thread execution monitor.

3. The apparatus of claim 1, the device memory comprising instructions that when executed by the device processor cause the device processor to cause the server to reinitialize based on a determination of malfunction in the server.

4. The apparatus of claim 1, the device memory comprising instructions that when executed by the device processor cause the device processor to utilize past indications from the first and second health detectors to distinguish between malfunction, security breach, and normal operation in the server.

5. The apparatus of claim 1, the device memory comprising instructions that when executed by the device processor cause the device processor to determine the server requires repair in response to a determination of malfunction in the server.

6. The apparatus of claim 1, the first indication comprised in first status data received from the first health detector in a first recurring interval and the second indication comprised in second status data received from the second health detector in a second recurring interval.

7. The apparatus of claim 1, wherein the integrity verification routine verifies integrity of the VMM.

8. The apparatus of claim 1, the device memory comprising instructions that when executed by the device processor cause the device processor to:
   analyze the first and second indications; and
   request additional status information from the server based on the analysis to distinguish between malfunction, security breach, and normal operation in the server.

9. The apparatus of claim 8, the additional status information comprising a current register setting or contents of storage at one or more locations.

10. At least one non-transitory computer-readable medium comprising a set of server instructions executable by a server processor circuit and a set of device instructions executable by a device processor circuit, the set of server instructions in response to being executed by the service processor circuit, cause the server processor circuit to:
 receive a time-related indication that indicates a first timer has reached an end of a first period of time,
 cease, responsive to the time-related indication, execution of a virtual machine monitor (VMM) and commence execution of a VMM watcher,
 disable, at least partially, an interrupt controller responsive to commencement of execution of the VMM watcher, and
 monitor execution of the VMM watcher:
 the set of device instructions in response to being executed by the device processor circuit, cause the device processor circuit to:
 identify a first indication from a first health detector, the first indication associated with a first operating condition of a server monitored by the first health detector, wherein the server comprising the first health detector,
 identify a second indication from a second health detector, the second indication associated with a second operating condition of the server monitored by the second health detector,
 identify a third indication from the VMM watcher, the third indication associated with completion of an integrity verification routine in a predefined time, and
 distinguish between malfunction, security breach, and normal operation in the server based on the first indication, the second indication, and the third indication.

11. The at least one non-transitory computer-readable medium of claim 10, the first health detector comprising one or more of a temperature sensor and a voltage sensor and the second health detector comprising one or more of a bus activity, clock signal, and processor thread execution monitor.

12. The at least one non-transitory computer-readable medium of claim 10, the set of device instructions in response to being executed by the device processor circuit, cause the device processor circuit to cause the server to reinitialize in response to malfunction in the server.

13. The at least one non-transitory computer-readable medium of claim 10, the set of device instructions response to being executed by the device processor circuit, cause the device processor circuit to determine the server requires repair in response to malfunction in the server.

14. The at least one non-transitory computer-readable medium of claim 10, the first indication comprised in first status data received from the first health detector in a first recurring interval and the second indication comprised in second status data received from the second health detector in a second recurring interval.

15. The at least one non-transitory computer-readable medium of claim 10, wherein the integrity verification routine verifies integrity of the VMM.

16. The at least one non-transitory computer-readable medium of claim 10, the set of device instructions in response to being executed by the device processor circuit, cause the device processor circuit to:
 analyze the first and second indications; and
 request additional status information from the server based on the analysis to distinguish between malfunction, security breach, and normal operation in the server.

17. A computer-implemented method, comprising:
 receiving, at a server, a time-related indication that indicates a first timer has reached an end of a first period of time;
 ceasing, at the server responsive to the time-related indication, execution of a virtual machine monitor (VMM) and commence execution of a VMM watcher;
 disabling at the server, at least partially, an interrupt controller responsive to commencement of execution of the VMM watcher;
 monitoring, at the server, execution of the VMM watcher;
 identifying, at a device, a first indication from a first health detector, the first indication associated with a first operating condition of the server monitored by the first health detector;
 identifying, at the device, a second indication from a second health detector, the second indication associated with a second operating condition of the server monitored by the second health detector;
 identifying, at the device, a third indication from the VMM watcher, the third indication associated with completion of an integrity verification routine in a predefined time; and
 distinguishing, at the device, between malfunction, security breach, and normal operation in the server based on the first indication, the second indication, and the third indication.

18. The computer-implemented method of claim 17, the first health detector comprising one or more of a temperature sensor and a voltage sensor and the second health detector comprising one or more of a bus activity, clock signal, and processor thread execution monitor.

19. The computer-implemented method of claim 17, comprising causing the server to reinitialize in response to malfunction in the server.

20. The computer-implemented method of claim 17, comprising determining the server requires repair in response to malfunction in the server.

21. The at least one non-transitory computer-readable medium of claim 16, the additional status information comprising a current register setting or contents of storage at one or more locations.

22. The computer-implemented method of claim 17, wherein the integrity verification routine verifies integrity of the VMM.

* * * * *